US009794641B2

(12) United States Patent
Shackleton et al.

(10) Patent No.: US 9,794,641 B2
(45) Date of Patent: Oct. 17, 2017

(54) VIDEO SEGMENT PRESENTATION TRACKING

(75) Inventors: Lane P. Shackleton, San Francisco, CA (US); Jamieson R. Kerns, Santa Monica, CA (US); Matthew S. Marzilli, Santa Monica, CA (US); Mauricio Zuluaga, Adliswil (CH)

(73) Assignee: GOOGLE INC., Mountain View, CA (US)

( * ) Notice: Subject to any disclaimer, the term of this patent is extended or adjusted under 35 U.S.C. 154(b) by 497 days.

(21) Appl. No.: 13/242,818

(22) Filed: Sep. 23, 2011

(65) Prior Publication Data
US 2013/0077940 A1 Mar. 28, 2013

(51) Int. Cl.
| | |
|---|---|
| *H04N 9/82* | (2006.01) |
| *H04N 21/6583* | (2011.01) |
| *H04N 5/91* | (2006.01) |
| *H04N 21/442* | (2011.01) |
| *H04N 21/81* | (2011.01) |
| *H04N 21/845* | (2011.01) |
| *H04N 5/765* | (2006.01) |

(52) U.S. Cl.
CPC .......... *H04N 21/6583* (2013.01); *H04N 5/91* (2013.01); *H04N 21/44222* (2013.01); *H04N 21/812* (2013.01); *H04N 21/8456* (2013.01); *H04N 5/765* (2013.01); *H04N 9/8205* (2013.01)

(58) Field of Classification Search
CPC . G11B 27/28; G11B 2220/90; G11B 2220/20; H04N 21/812; H04N 5/76
See application file for complete search history.

(56) References Cited

U.S. PATENT DOCUMENTS

| | | |
|---|---|---|
| 2003/0033325 A1 | 2/2003 | Boogaard |
| 2004/0230994 A1 | 11/2004 | Urdang et al. |
| 2005/0185921 A1 | 8/2005 | Skran et al. |
| 2008/0040740 A1* | 2/2008 | Plotnick et al. ............... 725/32 |
| 2008/0092159 A1 | 4/2008 | Dmitriev et al. |

(Continued)

OTHER PUBLICATIONS

International Search Report and the Written Opinion of the International Searching Authority or Declaration for PCT/US2012/049481 dated Dec. 14, 2012, 9 pages.

(Continued)

*Primary Examiner* — William C Vaughn, Jr.
*Assistant Examiner* — Daniel Tekle
(74) *Attorney, Agent, or Firm* — Lowenstein Sandler LLP

(57) ABSTRACT

Methods, systems, and apparatus, including computer programs encoded on a computer storage medium, for tracking presentation of content. In one aspect, a method includes segmenting a video into two or more segments. Each segment of the video can be a variably selected disjoint subset of the video. A client-side video player determines that playback of the video has reached the end of one of the segments. A presentation type for the video is determined, where the presentation type being one of an advertisement presentation or a non-advertisement presentation. The playback data is provided to a server-side data processing apparatus that stores the playback data in a data store. The playback data indicate the presentation type for the video and that playback of the video reached the end of the one of the segments.

27 Claims, 8 Drawing Sheets

(56) References Cited

U.S. PATENT DOCUMENTS

2011/0110646 A1* 5/2011 Smith ................... H04H 20/31
386/241

OTHER PUBLICATIONS

Office Action and Translation for Korean Patent Application Serial No. 10-2014-7010874, dated Aug. 18, 2014, 6 pages.
Office Action and Translation dated Nov. 28, 2016 for China Patent Application Serial No. 201280057046.6, 17 pages.

* cited by examiner

VIDEO SEGMENT PRESENTATION TRACKING

BACKGROUND

This specification relates to data processing and tracking video playback.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page.

Video advertisements are a type of advertisement that can be presented in the advertisement slots that have been defined in a web page. Video advertisements can also be presented in other types of advertisement slots, such as in advertisement slots (e.g., periods of time) that have been defined in other videos. The performance of these video advertisements may be analyzed based on a number of users that have requested presentation of the video advertisement (e.g., by initiating playback of the video advertisement). However, evaluation of the number of users that requested presentation of the video advertisement alone may not provide an advertiser with sufficient performance information.

SUMMARY

In general, one innovative aspect of the subject matter described in this specification can be embodied in methods that include the actions of segmenting a video into two or more segments, each segment of the video being a variably selected disjoint subset of the video; determining, by a client-side video player, that playback of the video has reached the end of one of the segments; determining a presentation type for the video, the presentation type being one of an advertisement presentation or a non-advertisement presentation; providing, to a server-side data processing apparatus, playback data indicating that playback of the video reached the end of the one of the segments, playback data further specifying the presentation type of the video. Other embodiments of this aspect include corresponding systems, apparatus, and computer programs, configured to perform the actions of the methods, encoded on computer storage devices.

These and other embodiments can each optionally include one or more of the following features. Segmenting the video can include determining a total duration of the video; and selecting segment end times for each of the segments, the segment end time for each segment being pseudo-randomly selected.

Determining that playback of the video has reached the end of one of the segments can include determining that a time specified by a playback timer for the video matches one of the segment end times.

Methods can further include the operation of identifying, for each of the segment end times, a frame of the video that is presented at the segment end time. Determining that playback of the video has reached the end of one of the segments can include determining that the frame that is presented at the segment end time for the one of the segments was presented.

Segmenting the video can include segmenting the video into a variably selected number of segments. Providing the playback data to the server-side data processing apparatus can include transmitting an HTTP request to the server-side data processing apparatus, the HTTP request including a timestamp indicating a time at which playback of the video reached the end of the segment.

Methods can further include the operations of receiving, by the video analysis apparatus, the playback data; and storing the playback data to a data store, the playback data being stored with a reference to the video and an identifier indicative of a user device at which the video was presented. Methods can further include the operation of determining, based on the playback data, viewership measures for the video, the viewership measures being indicative of a relative number of presentations of the video that reached the end of the segment, the viewership measures being based on aggregate playback data for multiple presentations of the video.

Particular embodiments of the subject matter described in this specification can be implemented so as to realize one or more of the following advantages. Data indicating that playback has reached a particular location in a video can be achieved without requiring continuous playback of the video that preceded the particular location of a video. For example, if playback of the point in a video that is 50% of the total duration is being tracked, all of the video that occurs prior to the 50% point need not be presented in order to obtain information that the 50% point was presented. Segment end points for various segments of a video are variably selected (e.g., pseudo-randomly selected or otherwise variably selected so that the end points are placed at different locations over time) so that a more granular measure of viewership can be obtained without requiring the video to be further segmented. For example, by varying the segment end times for four segments, presentation data can be obtained across a full duration of a video (e.g., 0-100% of the video in 1% increments) rather than at 5 points (e.g., 0%, 25%, 50%, 75%, and 100%) across the full duration.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A video player (or browser) is configured to provide playback data indicating that playback of a video has reached the end of a video segment. A video segment is a portion of a video, and the video player can be configured to segment videos that are received for presentation. As used throughout this specification, the term "video" is used to include media that does not include a visual component unless otherwise specified. For example, a video can include audio content but not include video content, audio and video content, or video content but not include audio content.

In some implementations, the video player pseudo-randomly (or otherwise variably) selects segment end times (e.g., times at which respective segments are considered to end), and monitors playback of the video to determine whether playback of the video reached the end of a segment. For example, the video player can determine whether a time specified by a playback timer matches the segment end time, or whether a segment end frame (e.g., a frame of the video that is presented at the segment end time) has been presented.

When the video player determines that playback of the video has reached the end of the segment, the video player transmits playback data to a server-side data processing apparatus indicating that the end of the segment was reached. The video player can send the playback data when the end of a segment has been reached irrespective of whether playback of the video has been temporarily interrupted or a portion of the video has been skipped by the user. The playback data are used by the server-side data processing apparatus to determine viewership measures for various portions of the video.

Figure 1:
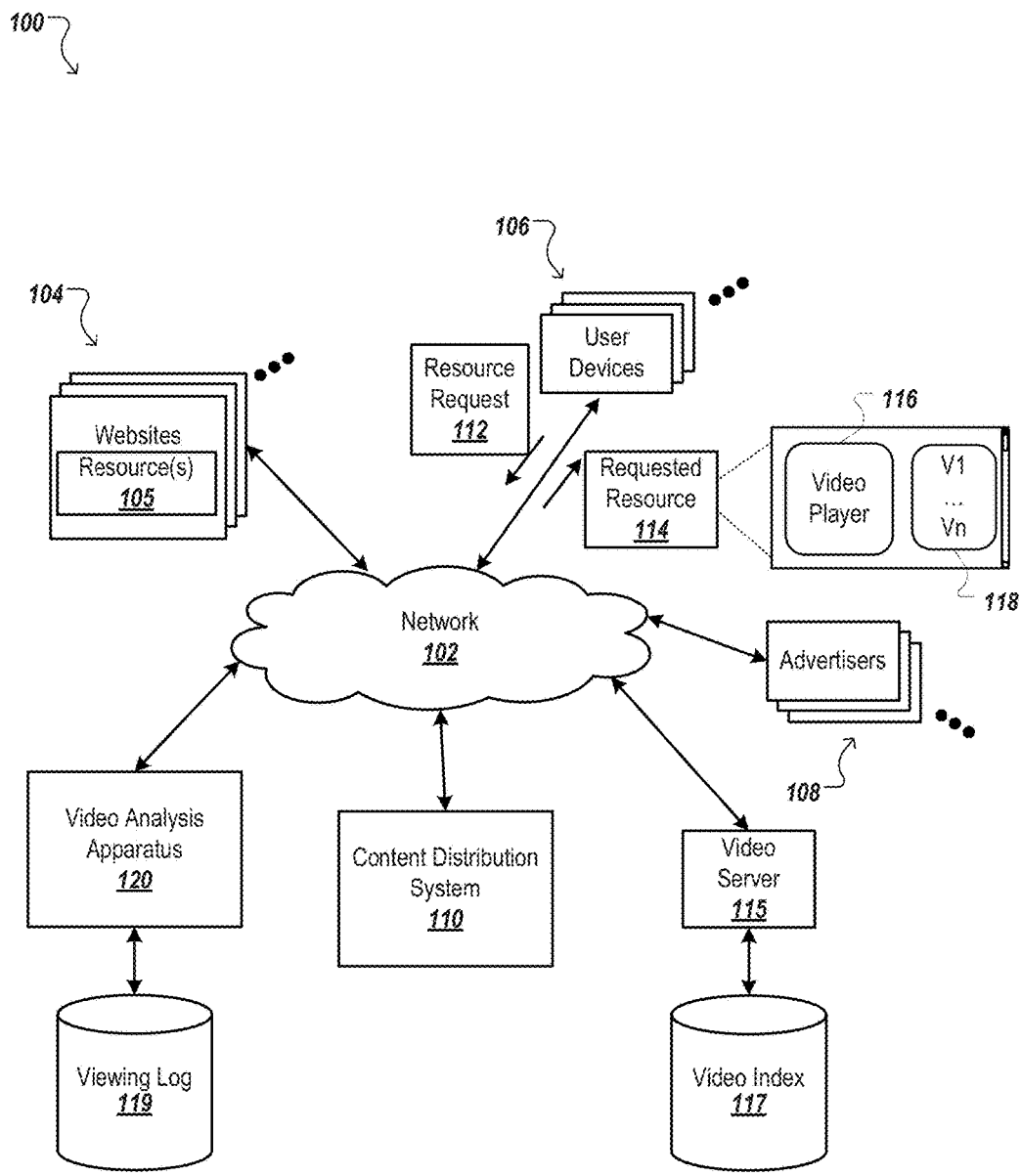
FIG. 1 is a block diagram of an example environment in which a content distribution system manages distribution of content items.

FIG. 1 is a block diagram of an example environment 100 in which a content distribution system 110 manages distribution of content items. The example environment 100 includes a network 102, such as a local area network (LAN), a wide area network (WAN), the Internet, or a combination thereof. The network 102 connects websites 104, user devices 106, advertisers 108, and the content distribution system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions. Units of content that are presented in (or with) resources are referred to as content items, and an examples of content items include advertisements that are presented with a web page, video files that are presented with a web page (e.g., in a video player), and/or audio files that are presented with a web page.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104 (e.g., a home page for a video sharing site), a search results page in which search results are presented, or another resource 105. The data representing the requested resource 114 can include data that cause presentation of resource content 116 at the user device.

Data representing a requested resource 114 can also include data specifying a portion of the resource (e.g., a portion of a web page or a portion of a user display (e.g., a presentation location of a slot of a web page) in which advertisements (or other video content items) can be presented. Throughout this document, these specified portions of the resource or user display are referred to as advertisement slots. Advertisement slots can also be defined within a video and/or prior to or following presentation of the video. For example, an advertisement slot can be inserted at the beginning, at the end, or at a pre-specified location in the video, and other videos (e.g., video advertisements) can be presented in these advertisements slots when a user device 106 requests presentation of the video in which the advertisement slot is defined.

When the resource request 112 is a request for a home page of a video sharing site, the requested resource 114 can include data that cause presentation of a video player 116 and one or more references to videos 118 (e.g., V1-Vn) that can be presented in the video player 116. The videos that are referenced can include, for example, videos that have been identified as responsive to a search query. For example, a video sharing site can include a search interface that enables users to submit search queries in order to identify videos of interest. A video search apparatus can use these search queries to identify videos that have been identified as relevant (e.g., based on labels that are associated with the videos) to the search query. In turn, the video search apparatus can provide data specifying the responsive videos, and references to the videos 118 can be presented at the user device 106.

Each reference to a video can be, for example, an active link that requests the video. For example, when a user interacts with (e.g., clicks on or otherwise selects) one of the references to the videos 118 the interaction can cause a request for the referenced video to be transmitted to a video server 115. In response to receiving the request, the video server 115 identifies the requested video from a video index 117, and provides the requested video to the user device for presentation in the video player 116.

The video index 117 is a data store that stores videos. Each of the videos can be indexed, for example, according to labels that have been associated with the video by the user that uploaded the video and/or users that have previously viewed the video. For example, a video of a kitten playing with a ball of yarn (referred to as the "kitten video") may be associated with the labels "kitten" "yarn", which could have been specified by the user that uploaded the video or users that have previously watched the video and submitted proposed labels for the video. These labels can be used, for example, to identify videos that are responsive to a search query and/or videos that are eligible for presentation in response to a content item request (e.g., an advertisement request).

When a resource 105 (e.g., a web page and/or a video) is requested by a user device 106, the content distribution system 110 receives a request for advertisements to be provided in an advertisement slot that has been defined for the resource 105. The request for advertisements can include characteristics of the advertisement slot in which the requested advertisement will be presented, and can be provided to the content distribution system 110.

For example, a reference (e.g., URL) to the requested resource 114 (e.g., a requested web page and/or a requested video) in which the advertisement slot is defined, a size of the advertisement slot (e.g., temporal and/or special), and/or media types that are eligible for presentation in the advertisement slot can be provided to the content distribution system 110. Similarly, keywords associated with a requested resource ("resource keywords") or labels (i.e., phrases of one or more words) associated with a requested video can also be provided to the content distribution system 110 to facilitate identification of advertisements that are relevant to the requested resource 114.

Based on data included in the request for advertisements, the content distribution system 110 selects advertisements that are eligible to be provided in response to the request ("eligible advertisements"). For example, eligible advertisements can include advertisements having characteristics matching the characteristics of the advertisement slots and that are identified as relevant to specified resource keywords and/or labels. In some implementations, advertisements having targeting keywords that match the resource keywords are selected as eligible advertisements by content distribution system 110.

The eligible advertisements can include video advertisements. Video advertisements can include, for example, video content items that have been created exclusively for presentation in advertisement slots 118 or other video content items that have been identified, by an advertiser, as being available for presentation in advertisement slots as well as being available as target videos in other viewing environments, such as online video sharing sites in which many different types of videos may be presented (e.g., user provided videos). For clarity, the term video content item is used to refer to a video that is being provided in response to a content item request (e.g., an advertisement request) for a requested resource, while the term target video will be used to refer to a video that is provided in response to a resource request 112. Video content items and target videos are collectively referred to as videos.

Advertisers may be interested in evaluating the performance of their video content items. For example, advertisers may want to evaluate portions of the total duration of video advertisements that users watch before terminating presentation of the video advertisement (e.g., by closing the browser window, skipping the video advertisement, or otherwise terminating presentation). Similarly, users that upload target videos (i.e., videos that are not being provided in response to an advertisement request) may be interested in tracking portions of their target videos that were presented to users.

The environment includes a video analysis apparatus 120 that tracks presentations of video content items (e.g., video advertisements) and provides advertisers information with which the advertisers can evaluate their video content items. The video analysis apparatus 120 can also track presentations of target videos that are presented to users. The video analysis apparatus 120 is depicted as being implemented independent of the content distribution system 110, but can also be implemented entirely, or in part, in the content distribution system 110.

In some implementations, the video analysis apparatus 120 tracks presentations of video content items (e.g., video advertisements) and/or target videos (i.e., non-advertisement videos) based on playback data received from the video player 116 (or browser) in which the video content items and/or target videos are being presented. For example, as described in more detail below, the video player 116 (or browser) can be configured to determine when presentation of a video reaches the end of a specified portion of the total duration of the video, generate playback data indicating that the presentation of the video has reached the end of the specified portion, and transmit the playback data to the video analysis apparatus 120. In turn, the video analysis apparatus 120 stores the received playback data in a viewer log 119, which is a data store that stores the playback data for videos.

The video analysis apparatus 120 can use the playback data for each video to provide video content owners or publishers (e.g., advertisers or other users that have uploaded videos) with information that facilitates evaluation of the performance of the video. In some implementations, the video analysis apparatus 120 uses the playback data for a particular video (e.g., a particular video advertisement) to determine a portion of the presentations (e.g., a relative number of the presentations) of the particular video that reached a specified location in the video (e.g., 25% of the total duration) prior to presentation of the video being terminated. For example, if a particular video was presented at 100 different user devices, and 25 of the presentations reached 25% of the total duration, the video analysis apparatus 120 could determine that 25% of the presentations of the video reached 25% of the total duration of the video. The discussion that follows generally describes the video analysis apparatus 120 as the apparatus that performs video analysis operations. However some or all of the operations could be performed by a user device or otherwise be performed by client devices.

Figure 2A:
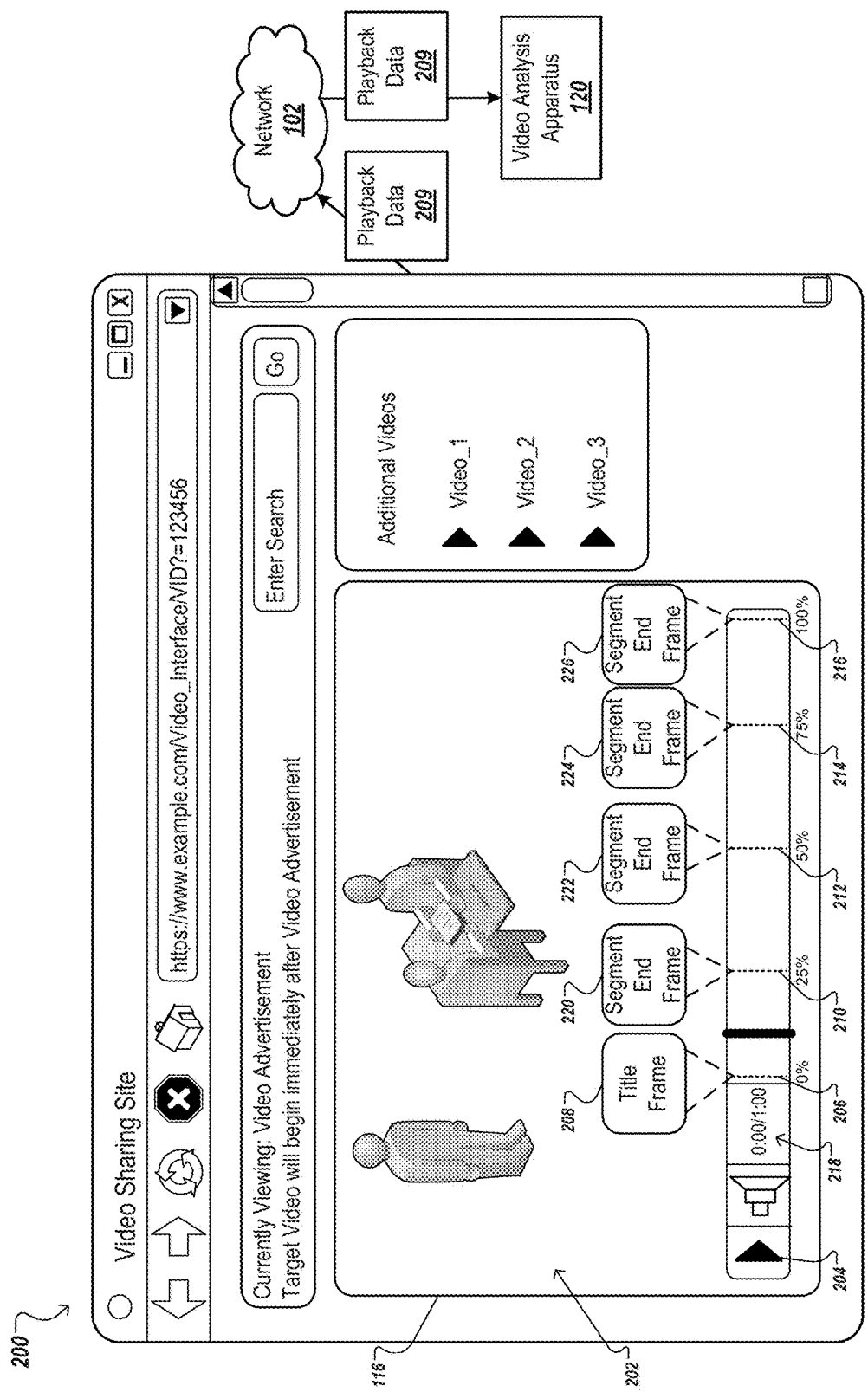
FIG. 2A is an example screen shot of a browser in which a video player presents a video.

FIG. 2A is an example screen shot of a browser 200 in which a video player 116 presents a video. The video player 116 includes a video presentation area 202 in which videos are presented. For example, upon receipt of a video, the video player can load (or begin to load) the video and await user interaction with a "play" element 204 before beginning presentation of the video. The video player 116 can alternatively begin playback of the received video immediately upon receipt of any portion of the video or after a pre-specified portion (e.g., 10%) of the video has been received by the video player 116.

The data representing the video (i.e., "video data") that are received by the video player 116 will generally include data specifying a total duration 206 of the video that is being received. For example, if a particular video is 1 minute long, then the video data for the video can include "total duration" data specifying 1 minute as the total duration of the video. The video player 116 can use the total duration data to determine a portion of the total duration of the video that has been received by the video player, and further to determine playback times at which one or more different segments of the video are considered to have ended.

For example, assume that the video player 116 segments a video into 4 different segments ("quartiles"), and that the duration data for the video indicates that the total duration of the video is 1 minute. In this example, the first segment of the video includes the first 15 seconds of the total duration (e.g., from time=0 seconds to time=15 seconds), the second segment of the video includes the second 15 seconds of the total duration (e.g., from time=16 seconds to time=30 seconds), the third segment of the video includes the third 15 seconds of the total duration (e.g., time=31 seconds to time=45 seconds), and the fourth segment of the video includes the final 15 seconds of the total duration (e.g., time=46 seconds to time=60 seconds).

Quartiles are used for example purposes throughout this document, but the video player can segment a video into any number of different segments. For example, the video in the example above may be segmented into 60 segments that are each 1 second long. Also, although each segment can be a disjoint subset of the total duration of the video, in some implementations, segments are not required to be disjoint subsets. Thus, two or more different segments may be allowed to include overlapping portions of the total duration. For example, the second segment in the example above may be defined to also include all or a part of the first segment, such that the second segment may include the first and second 15 seconds of the total duration (e.g., time=0 to time=30). The number of segments into which a video is segmented can also be pseudo-randomly selected.

Each segment can also be specified in terms of the percentage of the total duration that included in the segment. For example, when the video player segments a video into quartiles, the first segment can be defined to include 25% of the total duration, and the end of the first segment can be located at a playback time that corresponds to an end of 25% of the total duration (i.e., relative to the beginning of the video). Similarly, the ends of the second, third, and fourth segments can be respectively located at playback times that correspond to 50%, 75% and 100% of the total duration.

The video player 116 can be configured to monitor the playback (i.e., presentation) of the video to determine whether the playback has reached the end of a segment. For example, assume that playback of the video begins at the beginning of the video 206 (i.e., 0% of the total duration), and that a title frame 208 is the first frame that is presented. In this example, when presentation of the video is initiated (e.g., in response to the user interacting with the play element 204 or playback automatically beginning) the video player 116 can transmit to the video analysis apparatus 120 playback data 209 specifying that playback of the video was initiated.

Playback data are data specifying various playback events (e.g., playback started, playback ended). The playback data can be formatted, for example, as an HTTP GET request that is used to transmit information regarding the playback of the video to the video analysis apparatus 120.

The playback data include data specifying a video identifier that identifies the video that was presented at the user device. For example, when each video is uploaded to (or otherwise stored in) the video index 114 of FIG. 1, the video can be associated with (e.g., stored with a reference to and/or indexed according to) a unique video identifier that is assigned to the video (e.g., by the video server 115). The video identifier can then be used as a reference to the video. For example, active links that are used to request the video can include the video identifier, and the video server can identify this video identifier from a request in order to locate the video in the video index. The playback data can also include a user identifier (e.g., a cookie) that is associated with (e.g., stored on) the user device at which presentation of the video occurred.

In some implementations, the playback data include a play-type indicator that specifies whether the video was presented as a video content item (e.g., an advertisement presentation) or a target video (e.g., a non-advertisement video presentation). The play-type indicator can enable the video analysis apparatus 120 to determine separate viewership measures (e.g., relative numbers of presentations that reached a particular location in the video) for presentations of a particular video when the video is presented as a content item (e.g., video advertisement) and when presented as a target video (e.g., a non-advertisement video). For example, playback data including a play-type indicator of "advertisement" can be used to determine viewership measures for the video when presented as an advertisement, while playback data including a play-type indicator of "target" or "non-advertisement" can be used to determine viewership measures for the video when presented as a target video (or non-advertisement video).

The playback data can further include data specifying a portion of the video that has been presented at the user device. For example, the playback data that are transmitted when playback of the video reached the end of the first segment 210 (e.g., 25% of the total duration) can indicate that playback of the video reached the end of the first segment 210. Similarly, playback data that are transmitted when playback of the video has reached the end of each subsequent segment 212, 214, and 216 (e.g., 50%, 75%, and 100% of the total duration) can respectively specify the end of the segment past which playback has proceeded.

There are several techniques that the video player 116 can use to determine that playback of the video has proceeded past the end of a particular segment of the video. In some implementations, the video player can compare a time specified by a playback timer 218 (a timer indicative of temporal progression through the total duration of the video) to the playback times at which each of the respective segments ends. For example, assume that the first segment of a particular video ends 15 seconds after the beginning of the particular video. In this example, the video player 116 can monitor the time that is specified by the playback timer 218, and when the time specified by the playback timer 218 is 15 seconds, the video player 116 can determine that the end of the first segment 210 has been reached. In turn, the video player 116 can transmit (e.g., to the video analysis apparatus 120) playback data 209 specifying that the end of the first segment 210 has been reached and also specifying the user identifier for the user device at which the video was presented.

The video player 116 can continue to monitor the time specified by the playback timer 218 and determine whether the time specified matches playback times at which other segments of the particular video are considered to end. For example, assume that other sections of the particular video are considered to respectively end at 30 seconds, 45 seconds, and 60 seconds after the beginning of the particular video. In this example, the video player 116 can determine that an additional section of the particular video have been presented when the time specified by the playback timer 218 is 30 seconds, 45 seconds, or 60 seconds. In response to determining that an additional section of the particular video has been presented at the user device, the video player 116 can transmit additional video playback data 209 specifying that the additional section of the particular video has been presented at the user device. For example, when the time specified by the playback timer is 30 seconds, the video player 116 can transmit video playback data 209 indicating that the second segment of the particular video has been presented at the user device (i.e., playback of the video reached the end of the second segment 212). Similarly, in this example, the video player 116 can transmit additional playback data 209 when the time specified by the playback timer 218 is 45 seconds or 60 seconds.

In some implementations, the video player 116 can determine that a particular segment of the video has been presented when a frame of the video that is located at the end of the particular segment has been presented. The video player 116 can identify the frame that is located at the end of the particular segment, for example, by determining a frame of the video (referred to as a segment end frame) that is presented when the end of the particular segment is reached. The segment end frame for a particular segment can be identified, for example, by determining the playback time (e.g., a time relative to the beginning of the video) at which the end of the particular segment is considered to end, and identifying the frame of the video that is presented at that playback time.

For example, assume that the end of the first segment 210 is considered to end when 25% of the total duration of the video has been presented. In this example, the video player 116 can determine a specific playback time at which 25% of the video is presented (e.g., relative to the beginning of the video). In turn, the video player 116 can identify the frame of the video that is presented at the specific playback time as the segment end frame 220 for the first segment of the video.

The video player 116 can monitor playback of the video for presentation of segment end frame 220 for the first segment. When the video player 116 determines that the segment end frame 220 for the first segment (or another end segment frame) has been presented, the video player 116 can transmit the playback data 209 indicating that playback of the video reached the end of the first segment 210.

The video player 116 can identify segment end frames for each segment of the video, and monitor playback of the video to determine whether any of the segment end frames have been presented. For example, assume that the video player 116 has segmented a video into quartiles, as illustrated by FIG. 2A. In this example, the video player 116 can identify a first segment end frame 220 at which the first segment of the video is considered to end. The video player 116 can also identify a second segment end frame 222 at which the second segment of the video is considered to end, a third segment end frame 224 at which the third segment of the video is considered to end, and a fourth segment end frame 226 at which the fourth segment of the video is considered to end. In response to determining that any of these segment end frames (e.g., 220, 222, 224, or 226) are presented, the video player 116 can transmit playback data 209 to the video analysis apparatus 120 indicting that playback of the video has reached the end of the corresponding segment.

Figure 2B:
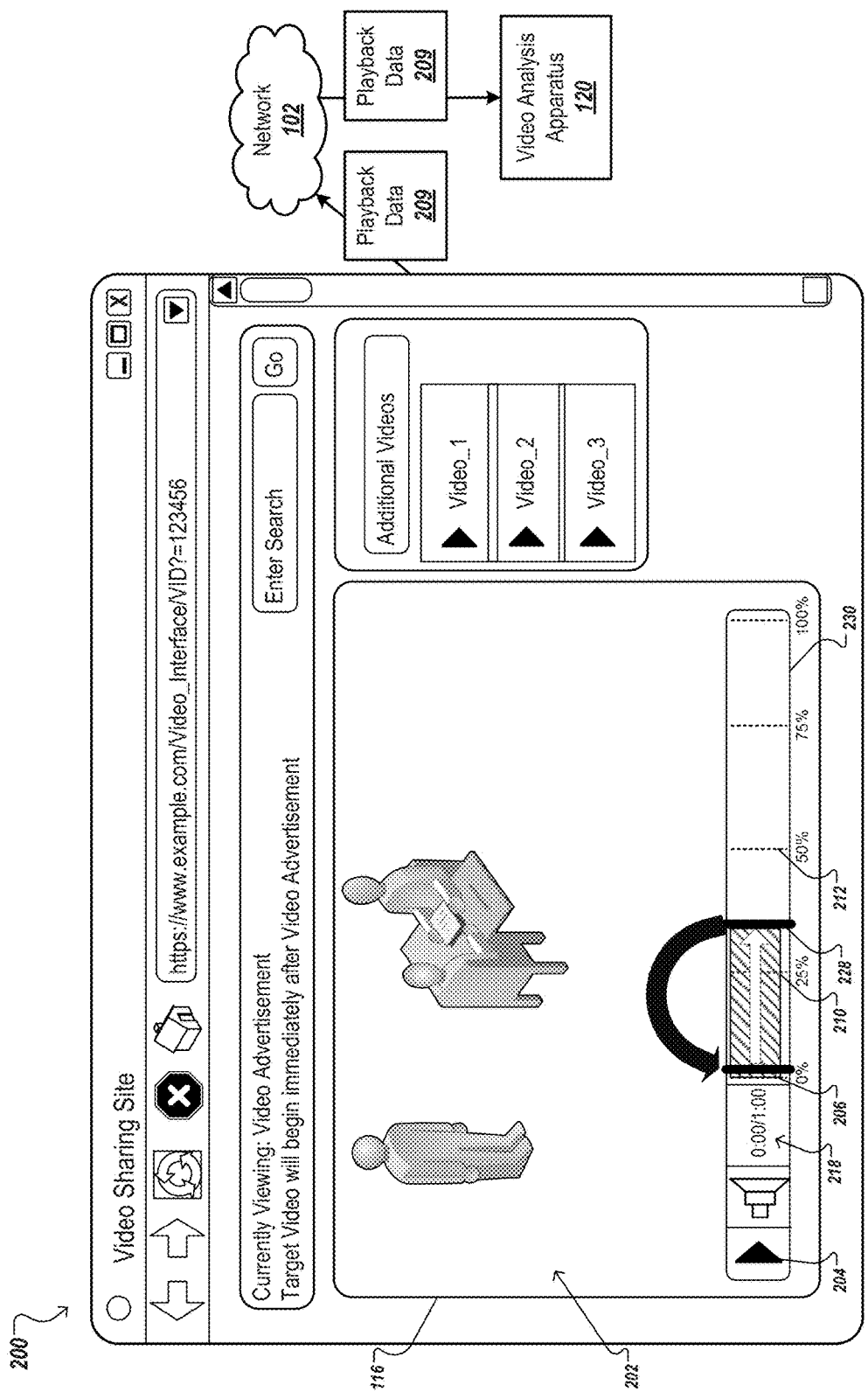
FIG. 2B is another screen shot of the browser in which the video player presents a video.

FIG. 2B is another screen shot of the browser 200 in which the video player 116 presents a video. The video player 116 may be configured in a manner that enables a user to change the portion of the video that is being presented by interacting with a progression indicator 228 (i.e., a user interface element that indicates a portion of the video that is being presented). For example, assume that playback of the video reached the end of the first segment 210 and continued into the second segment of the video. When playback of the video reached the end of the first segment 210, the video player 116 would transmit playback data 209 indicating that playback of the video reached the end of the first segment 210.

Continuing with this example, further assume that prior to playback of the video reaching the end of the second segment 212 the video player 116 received a request to resume playback of the video from the beginning of the video (e.g., 0% of the total duration). The request can be received, for example, in the form of interaction data indicating that that the progression indicator 228 was repositioned at the beginning of the video (e.g., through user interaction with the progression indicator 228). The interaction data can be received, for example, in response to a user performing a click and drag operation in which the user clicks the progression indicator 228 and changes its position. The interaction data can also be received, for example, in response to the user clicking (or otherwise affirmatively selecting) a location on a progression bar 230 in which the progression indicator 228 is located.

In response to receiving the request, the video player 116 can begin playback of the video at the location of the video specified in the request. Continuing with the example above, the video player 116 can begin playback at the beginning of the video (e.g., 0% of the total duration) in response to the request, such that the first segment of the video can be presented again.

When playback of the video again reaches the end of the first segment 210, the total presentation time of the video will be at least 50% of the total duration (e.g., assuming that the video is segmented into quartiles of matching duration). For example, 25% of the total duration of the video was presented when the initial playback of the video reached the end of the first segment 210. Similarly, 25% of the total duration of the video would again be presented when playback of the video again reached the end of the first segment after presentation of the video was restarted. Thus, the total presentation time of the video would be at least 50% of the total duration of the video. However, in this example, only the end of the first segment 210 was reached during playback, such that the playback data would specify that the end of the first segment 210 was the only segment end reached during playback.

In some implementations, the video player 116 transmits playback data 209 indicating that playback of the video reached the end of a particular segment each time the end of the particular segment is reached (i.e., irrespective of whether the end of the segment has previously been reached). Continuing with the previous example, the video player 116 can first transmit playback data 209 indicating that the end of the first segment 210 was reached when the initial playback of the video reached the end of the first segment 210. The video player 116 can also transmit additional playback data indicating that the end of the first segment 210 was reached when the subsequent playback (i.e., playback following receipt of a request to resume playback from another location in the video) reached the end of the first segment 210. The video analysis apparatus 120 can log each instance of the playback data 209 or filter multiple instances of the same playback data from a same user device.

Figure 2C:
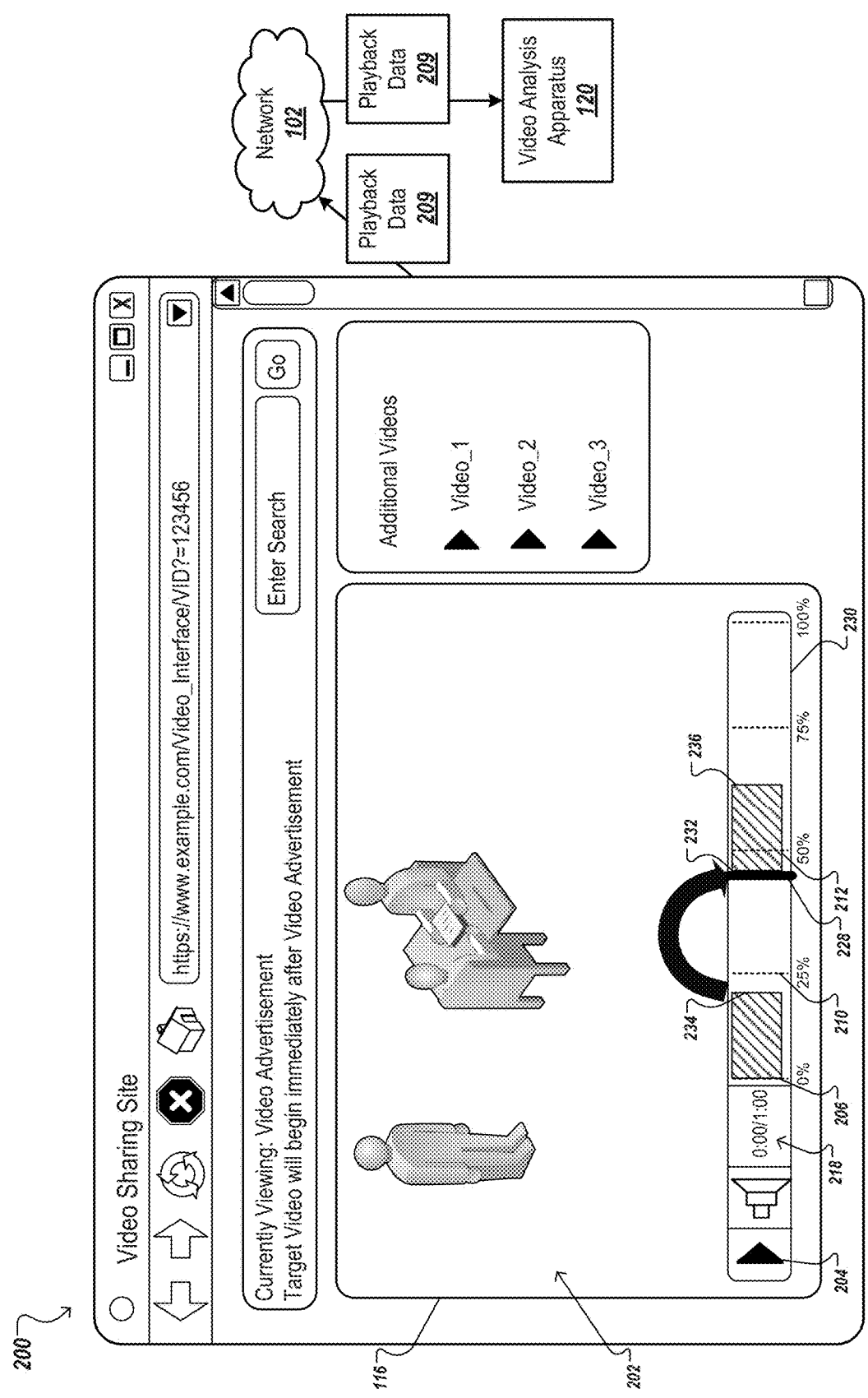
FIG. 2C is another screen shot of the browser in which the video player presents a video.

FIG. 2C is another screen shot of the browser 200 in which the video player 116 presents a video. As illustrated by FIG. 2C, the video player 116 can also be configured to enable a user to "skip" a portion of the video. For example, assume that playback of the video starts at the beginning of the video 206, but before playback of the video reaches the end of the first segment 210, the video player 116 receives a request to resume playback at a location of the video 232 in the second segment, thereby "skipping" presentation of the portion of the video that would have been presented as playback of the video progressed from point 234 to point 232.

In some implementations, the video player 116 is configured to not send playback data indicating that the end of a segment has been reached when playback of the video is interrupted prior to reaching the end of the video segment. For example, when the end of the first segment 210 is "skipped" through user interaction with the progression indicator 228 (e.g., by clicking and dragging the progression indicator 228 from point 234 to point 232), the video player 116 may not send playback data indicating that the end of the first segment 210 was reached (i.e., irrespective of playback of the video resuming at the point 232). However, if playback of the video proceeds from the point 232 to the point 236, playback of the video will reach the end of the second segment 212. Thus, the video player 116 can transmit playback data 209 indicating that the end of the second segment 212 was reached during playback.

As illustrated above, playback data indicating that the end of the second segment 212 (or the end of another later segment, such as the end of the third segment or the end of the fourth segment) was reached can be transmitted by the video player 116 even though playback data indicating that the end of the first segment 210 (or another previous segment) was not yet transmitted by the video player 116. As described above with reference to FIG. 2B, the video player 116 may be configured such that a user can also request that playback of the video resume at an earlier portion of the video. Thus, it is possible that the video player 116 will transmit playback data indicating that the end of the first segment 210 was reached after previously transmitting playback data indicating that the end of the second segment 212 was reached.

For example, with reference to FIG. 2C, assume that when playback of the video reaches the point 236, the video player 116 receives a request to resume playback of the video from the point 234 (prior to 25%). In this example, if the resumed playback reaches the end of the first segment 210, the video player 116 can transmit playback data 209 indicating that the end of the first segment 210 was reached (i.e., irrespective of the fact that the video player 116 previously transmitted playback data indicating that the end of the second segment 212 was reached). Thus, playback data 209 can be transmitted when the end of each segment is reached irrespective of the order in which the segments were viewed.

As described above, the playback data 209 are sent when the end of each segment is reached. When playback data are provided in this manner, it is possible that a user may view most of a segment (e.g., more than 50% of the segment) without playback reaching the end of that segment. Therefore, playback data indicating that the end of that segment was reached are not transmitted by the video player 116. Accordingly, the video analysis apparatus 120 may not receive data indicating that this particular portion of the video was presented, and this may affect the accuracy with which the video analysis apparatus 120 can determine a relative number of viewers that viewed a particular portion of the video.

One way of increasing the accuracy of determining a relative number of viewers that viewed a particular portion of a video is to increase the number of segments into which the video is divided. For example, if the video player segments a one minute video into 60 segments, each of the segments can be 1 second long (i.e., 60 seconds/60 segments=1 second/segment). Thus, the relative number of viewers that viewed any portion of the video greater than 1 second could be determined based on the playback data that were transmitted to the video analysis apparatus 120. However, the computing resources that are needed to manage the playback data that are received by the video analysis apparatus 120 increase in proportion to the number of segments into which videos are segmented. Therefore, depending on available computing resources (e.g., processing resources, communications bandwidth, and memory resources) the number of segments into which videos can be segmented may be limited, while additional accuracy may still be desired.

Another way of increasing the accuracy with which a relative number of viewers that have viewed a particular portion of a video is determined is to vary the portion of the video that is included in each of the segments. Varying the portion of the video that is included in a particular segment will vary the segment end time for the segment. For example, when 25% of the video is included in the first segment of a video, the segment end time for the first segment will be at 25% of the total duration of the video. Similarly, when 33% of the video is included in the first segment, the segment end time for the first segment will be at 33% of the total duration of the video, and when 10% of the video is included in the first segment, the segment end time for the first segment will be at 10% of the total duration of the video. Therefore, the portion of the video that must be presented in order to transmit playback data for a particular segment will also vary.

In some implementations, the video player 116 varies the portion of the video that is included in each segment. The video player 116 can vary the portion of the video that is included in each segment, for example, by pseudo-randomly (or otherwise variably) selecting the segment end times for each of the segments. For example, assume that the video player 116 is configured to segment videos into four segments. In this example, the video player 116 can pseudo-randomly select the segment end times (or use another selection technique, such as incrementing (or decrementing) the segment end times by a pre-specified amount) for each of the four segments, which in turn, determines the portion of the video that is included in each of the segments.

Figure 3A:
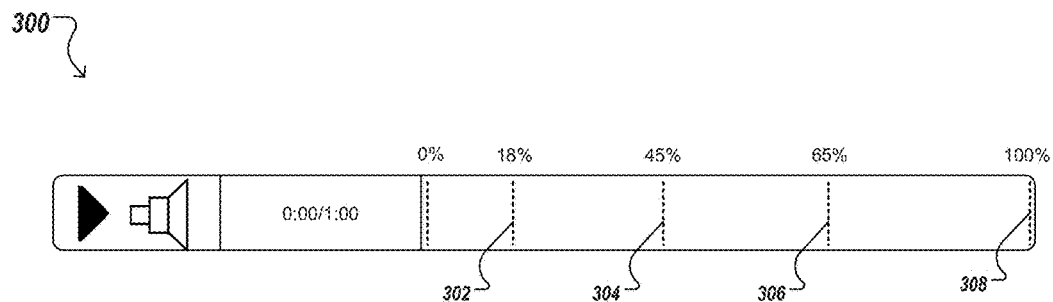
FIGS. 3A-3C are illustrations of a progression bar in which segments of various durations are delineated.
Figure 3B:
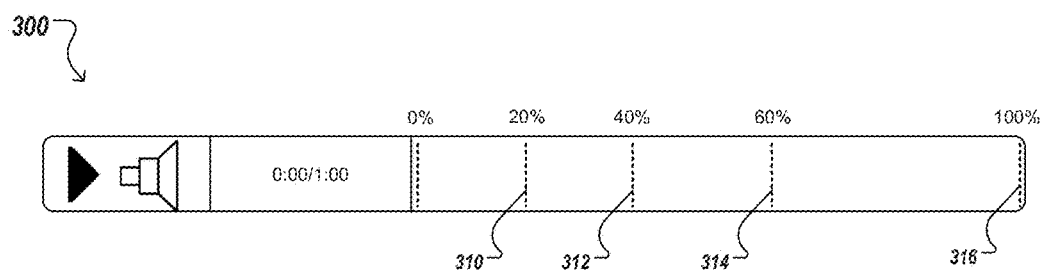
Figure 3C:
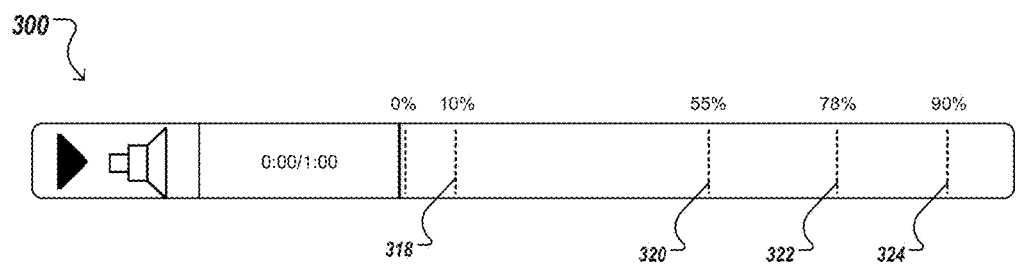

FIGS. 3A-3C are illustrations of a progression bar 300 in which segments of various durations are delineated. For example, as illustrated by the progression bar 300 in FIG. 3A, the video player has segmented the video into 4 segments, where the end of the first segment 302 is located at 18% of the total duration of the video (i.e., relative to the beginning of the video), the end of the second segment 304 is located at 45% of the total duration of the video, the end of the third segment 306 is located at 65% of the total duration of the video, and the end of the fourth segment 308 is located at 100% of the total duration of the video. Thus, the playback data for the first segment will be transmitted when playback of the video reaches 18% of the total duration, while the playback data for the second, third, and fourth segments will be sent when playback of the video reaches 45%, 65%, and 100% of the total duration of the video, respectively.

The playback data for each of the segments can include a reference to the location of the end of the segment that enables the video analysis apparatus 120 to determine the portion of the video to which the playback data corresponds. Continuing with the example above, the video player can transmit playback data for the first segment specifying that the end of the first segment was located at 18% of the total duration of the video. Alternatively (or additionally), the playback data for the first segment can include a segment end time specifying a playback time at which the end of the first segment is located (e.g., 15 seconds). The playback data for each of the other segments can include similar information specifying the location of the end of the segment.

Each time that a video is requested by a user device, the video player can select different segment end times for the video. For example, assume that the segment end times that are illustrated by FIG. 3A were selected by the video player for a first request of a particular video, and also assume that the video player selects the segment end times for a second and third request of the same particular video are illustrated by FIGS. 3B and 3C, respectively.

As illustrated by FIG. 3B, the segment end times 310, 312, 314, and 316 for the second request of the particular video are respectively located at 20%, 40%, 60%, and 100% of the total duration of the video. As illustrated by FIG. 3C, the segment end times 318,320, 322, and 324 for the particular video are respectively located at 10%, 55%, 78%, and 90% of the total duration of the video. Thus, the playback data that result from playback of the particular video when provided in response to the second and third requests will specify different information than the playback data that resulted from the playback of the video when provided in response to the first request.

For example, the playback data for the particular video provided in response to the second request will specify whether playback of the particular video reached 20%, 40%, 60%, and/or 100% of the total duration of the particular video. Meanwhile, the playback data for the particular video provided in response to the third request will specify whether playback of the particular video reached 10%, 55%, 78%, and/or 90% of the total duration of the particular video.

As users continue to request the particular video, the video player can continue to select different segment end times for the video, such that the aggregate playback data from the multiple requests will provide an aggregate viewing profile for the particular video. A viewing profile is a data set indicative of a portion of the presentations of the video that reached various points in the video. For example, a viewing profile can have one value indicating a relative number (e.g., a percentage) of the users that watched 100% of the video (i.e., a relative number of the presentations that reached the end of the total duration). This one value viewing profile is useful for determining how often the total duration of the video is presented, but does not provide information as to the number of users that watched a lesser portion of the video (e.g., 18% of the video).

Figure 4:
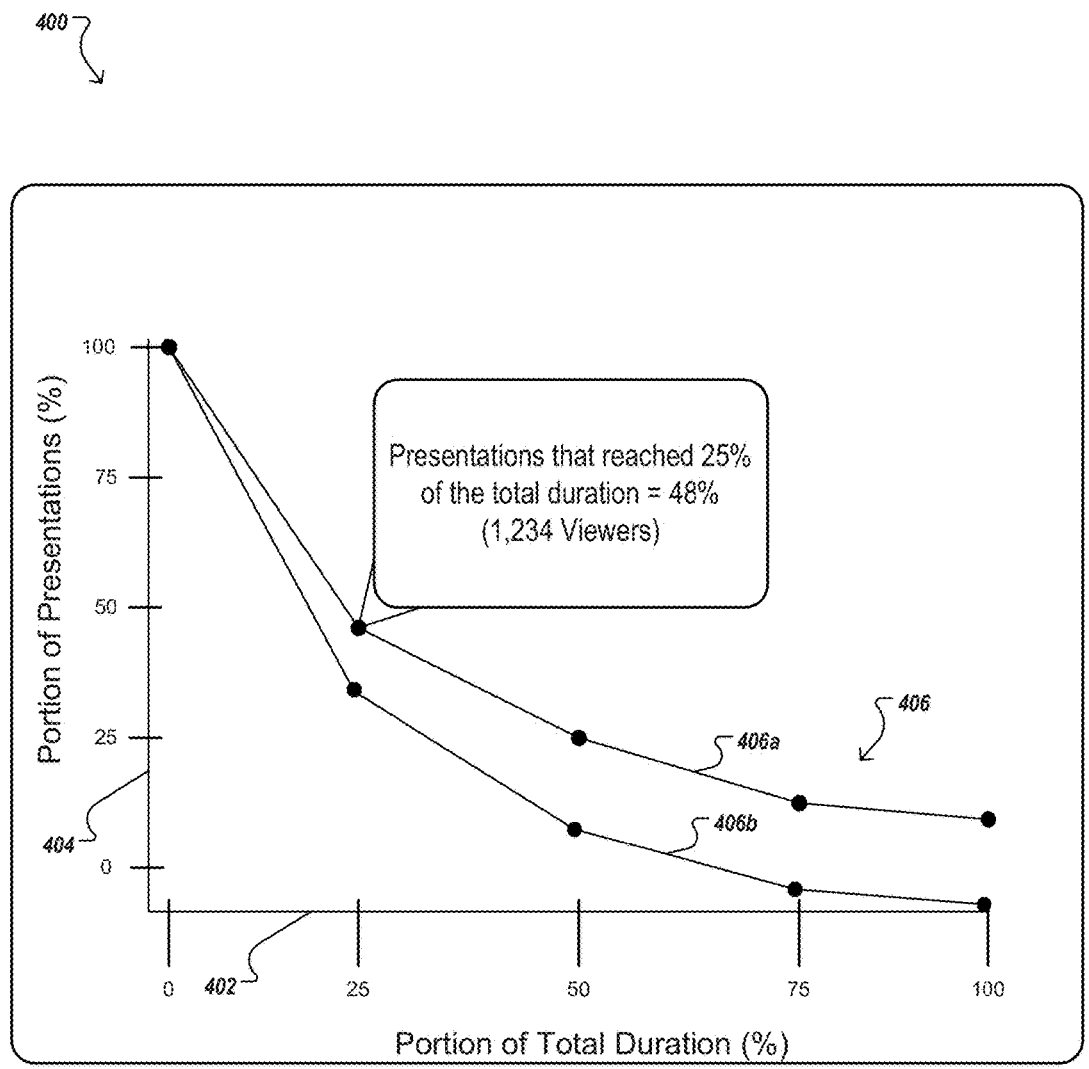
FIG. 4 is a graph of an example aggregate viewing profile for a video.

FIG. 4 is a graph 400 of an example aggregate viewing profile for a video. The aggregate viewing profile for a video is a set viewership measures for different portions (e.g., locations or points) of the video. The graph 400 has an x-axis 402 having an origin value of 0% of the total duration of the video and increases to 100% of the total duration (the x-axis 402 can also reference absolute values of playback time). The graph 400 has a y-axis 404 having an origin value of 0% of the total presentations of the video with values increasing to 100% of the presentations of the video (the y-axis can also specify absolute numbers of presentations or another relative measure of the presentations). The graph 400 can be created, for example, by the video analysis apparatus 120 of FIG. 1.

The graph 400 can be created based on the aggregate playback data that were generated during playback of a video when the video is segmented as described above with reference to FIGS. 3A-3C. In some implementations, the playback data for pseudo-randomly (or otherwise variably) selected segment end times are aggregated over a statistically relevant number of users, and the relative number of users that watched various portions of the video (i.e., the relative number of presentations that reached the end of various segments) can be plotted on graph 400. For example, according to the graph 400, 48% of the presentations of the video reached 25% of the total duration. The x-axis value of 25% can represent, for example, segments that ended at 25% of the total duration of the video. Similarly, the relative number of presentations that reached 25% of the total duration can be determined based on the playback data for presentations of the video in which a segment ended at 25% of the total duration.

The relative number presentations that reached each specified location (e.g., 25% of the total duration) in the video can be referred to as a play-through rate for that video location. For example, assume that at least a portion of a particular video was presented at 100 user devices, and that playback of 25 of these presentations reached 50% of the total duration of the video. In this example, the play-through rate for the 50% video location may be 25% (e.g., 25/100).

In some implementations, the graph 400 can include multiple curves 406, where one of the curves (e.g., 406*a*) represents the viewership measures (e.g., the relative number of presentations that reached a specified video location) computed using playback data having a play-type indicator value of "advertisement", and a second curve (e.g., 406*b*) represents the viewership measures computed using playback data having play-type indicator of "non-advertisement" or "target video".

Figure 5:
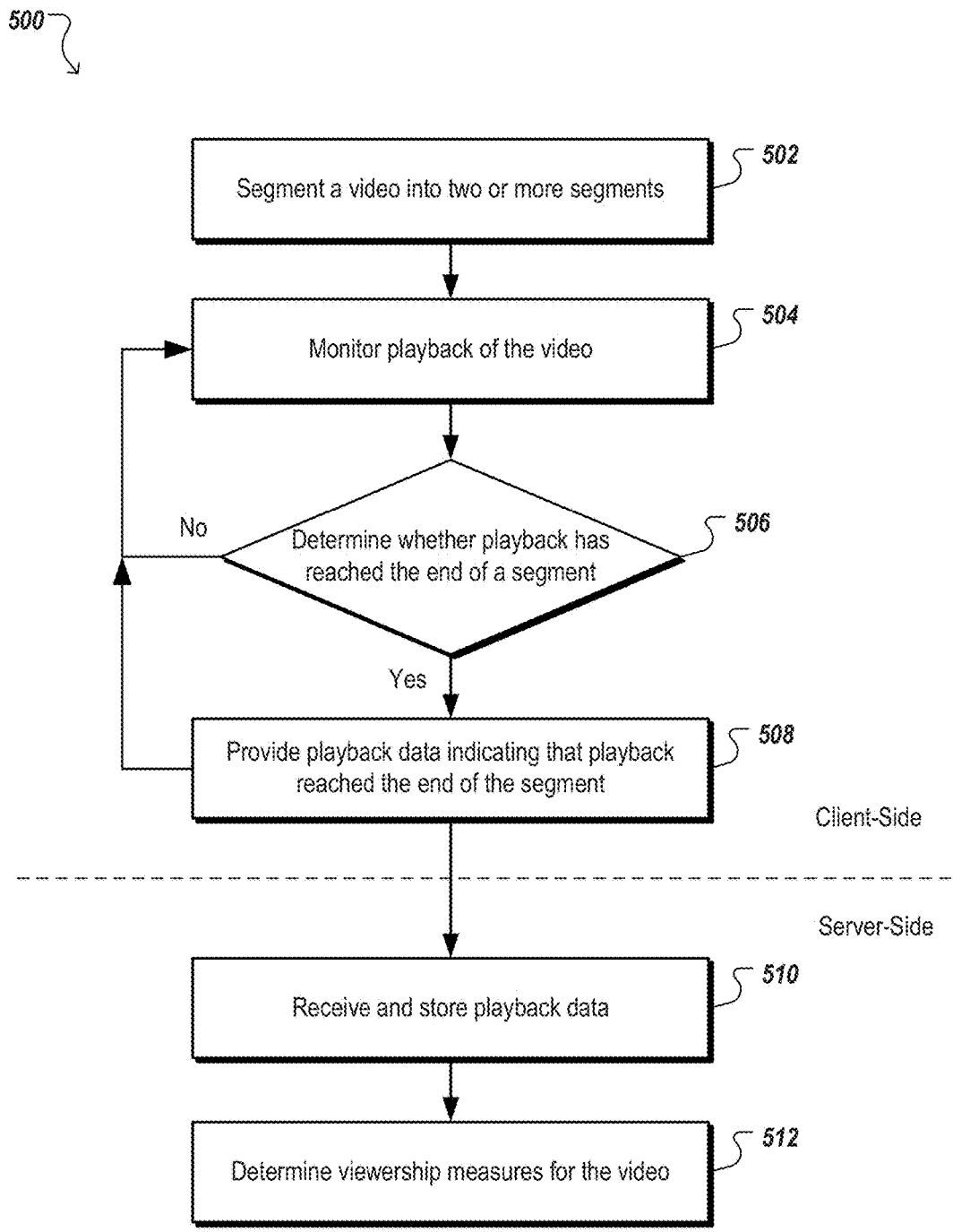
FIG. 5 is a flow chart of an example process for tracking video playback.

FIG. 5 is a flow chart of an example process 500 for tracking video playback. The process 500 is a process by which a video player segments a video into multiple segments and monitors playback of the video to determine whether playback of the video has reached the end of a segment. In response to determining that the playback has reached the end of a segment, the video player transmits playback data to a data processing apparatus (e.g., video analysis apparatus 120 of FIG. 1). The playback data that are transmitted will include data specifying the end of the segment that was reached during playback. The data processing device determines viewership measures for the video (e.g., relative measures of video presentations that reached particular points of the video), and provides those viewership measures to publishers or owners of the video.

A video is segmented into two or more segments (502). In some implementations, each segment of the video is a disjoint subset of the video, such that two segments of the video do not include a same portion of the video. For example, a one minute video can be segmented at 50% of the total duration of the video such that the end of the first segment of the video ends at 50% of the total duration and the second segment starts with the next frame of video that is presented after 50% of the total duration. As described above, the video can be segmented by a video player (or another client-side application or device) that requested the video.

In some implementations, the number of segments into which the video is segmented can be pseudo-randomly (or otherwise variably) selected. For example, when a video player receives a video, the video player can obtain the output of a pseudo-random number generator and segment the video into that number of segments. Additionally or alternatively, the video player can obtain the output of a number generator that selects numbers according to another number selection technique (i.e., that is not random or pseudo-random).

In some implementations, the video is segmented based on the total duration of the video and the number of segments into which the video is to be segmented. For example, the video can be segmented by determining a total duration of the video (e.g., based on data received with the video) and pseudo-randomly selecting a segment end time for each of the segments. The selected segment end time for each segment can be a pseudo-randomly selected time between 0 and the total duration of the video.

Playback of the video is monitored (504), and a determination is made whether playback of the video has reached the end of a segment (506). In some implementations, the playback of the video is determined to reach the end of a segment when a time specified by a playback timer matches the segment end time for a segment. For example, if the segment end time for a particular segment is 15 seconds after the beginning of the video, playback of the video can be determined to have reached the end of that particular segment when the time indicated by the playback timer is 15 seconds.

In some implementations, the playback of the video is determined to reach the end of a segment when a segment end frame is presented by the video player. For example, once the segment end time for a segment has been identified, a frame that is presented at the segment end time can be identified and designated as a segment end frame for the segment (e.g., a last frame in the segment). As playback of the video proceeds, the video player can monitor the playback to determine whether a segment end frame for any of the segments has been presented. In response to determining that a segment end frame has been presented, the video player can determine that playback of the video has reached the end of a segment corresponding to that segment end frame.

If it is determined that playback of the video has not reached the end of a segment, playback of the video continues to be monitored (506). When it is determined that playback of the video has reached the end of a segment, playback data are provided, where the playback data indicate that the playback reached the end of the segment (508). In some implementations, the playback data are provided by transmitting an HTTP GET request to a server-side data processing apparatus (e.g., the video analysis apparatus 120 of FIG. 1).

The playback data can include, for example, data specifying the particular segment end that was reached during playback. The playback data can also include, for example, a timestamp that enables the server-side data processing apparatus to determine an order in which the ends of different segments were reached during playback (as well as an order of occurrence for playback events, such as video pauses, video stoppages, video skips, and video repeats). As described above, the playback data can further include a video identifier for the video being presented and a user identifier for the user device at which the video is being presented, so that the server-side data processing apparatus can properly index and recover the playback data.

The playback data can also include a presentation type (also referred to as a "play-type) for the video. For example the playback data can include data specifying whether the video was presented as a video content item (e.g., an advertisement presentation of the video) or whether the video was presented as a target video (e.g., a non-advertisement presentation of the video). The presentation type of the video can be determined, for example, based on data included with the video when received as well as the request in response to which the video was provided.

For example, as described above, when a video is provided in response to an advertisement request, the presentation type of the video can be considered an advertisement presentation. However, if the video is provided in response to a request that is not a request for an advertisement (e.g., a request provided to an advertisement server), the presentation type for the video can be considered a non-advertisement presentation.

A server-side data processing apparatus receives and stores the playback data (510). In some implementations, the server-side data processing apparatus stores the playback data with a reference to the video and/or a reference to the user device from which the playback data was received. For example, the server-side data processing apparatus can index the playback data according to one or more of the video identifier for the video and the user identifier for the user device. The playback data can be stored in a data store, such as the viewer log 119 of FIG. 1.

Viewership measures are determined for the video (512). In some implementations, the viewership measures are indicative of a relative number of presentations of the video that reached various points in the video. For example, as described above, playback data that are aggregated from many different presentations of the video can be used to create a viewing profile. In some implementation, a separate viewing profile can be created for advertisement presentations of a video and non-advertisement presentations of the video to facilitate direct comparison of the durations of advertisement and non-advertisement presentations.

Figure 6:
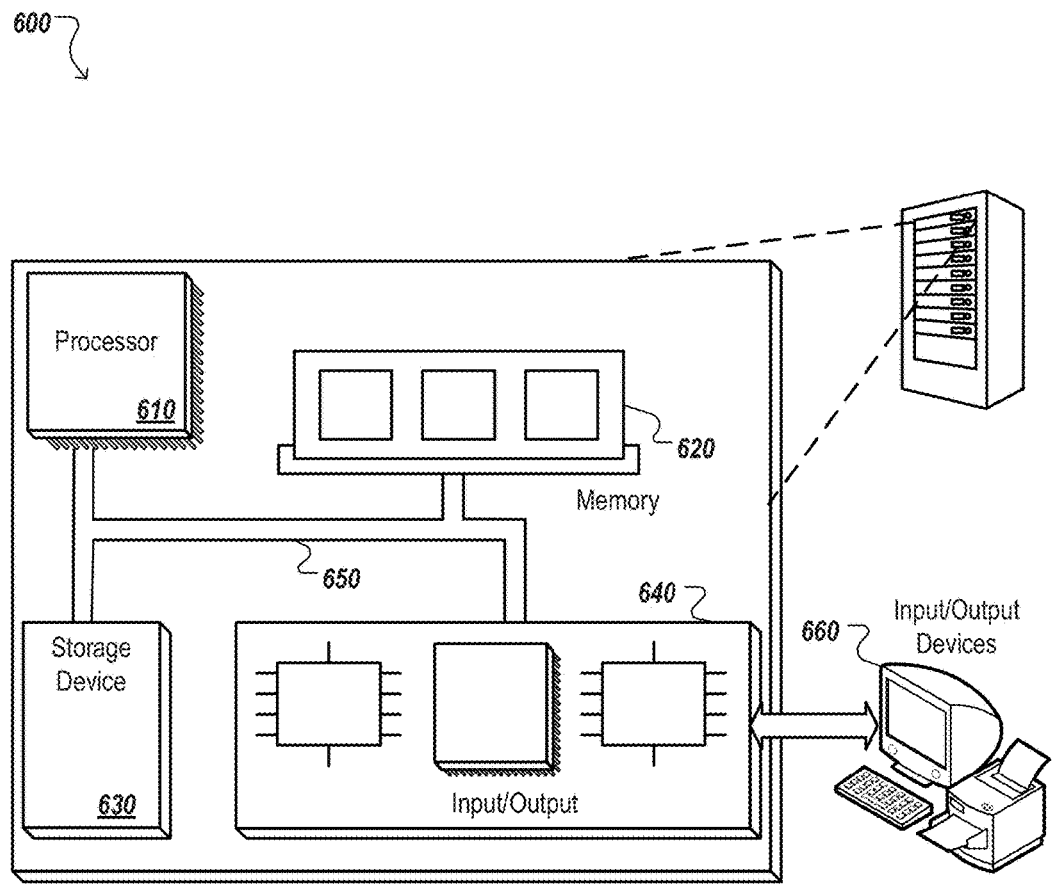
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   segmenting, by a client device including a processor, a video into a plurality of first segments;
   monitoring, by the client device, playback of the video for occurrences of playback of respective ends of the first segments; and
   in response to each occurrence of playback of an end of a segment among the first segments, providing, by the client device, to a server located remotely from the client device, playback data for the video specifying that the playback of the end of the segment has occurred and an indication of whether the playback of the video was an advertisement presentation type or a non-advertisement presentation type.

2. The method of claim 1, wherein segmenting the video comprises segmenting the video into the first segments having varying sizes.

3. The method of claim 1, wherein monitoring comprises determining that the playback of the video has reached the end of the segment by matching a time specified by a playback timer for the video to an end time of the segment.

4. The method of claim 1, further comprising identifying, by the client device, for each segment among the first segments, a respective frame of the video that corresponds to the end of each segment among the first segments.

5. The method of claim 4, wherein the monitoring comprises determining that the playback of the video has reached the end of the segment by determining that the respective frame corresponding to the end of the segment was presented.

6. The method of claim 1, further comprising:
   in response to initiation of the playback of the video resulting from an advertising request, determining, by the client device, that the playback of the video is the advertisement presentation type; and
   in response to initiation of the playback of the video resulting from a target video request, determining, by the client device, that the playback of the video is the non-advertisement presentation type.

7. The method of claim 1, wherein providing the playback data to the server comprises transmitting an HTTP request to the server, the HTTP request including a timestamp indicating a time at which the playback of the video reached the end of the segment.

8. The method of claim 1, wherein segmenting comprises:
   segmenting the video into the first segments in response to a first request for the video; and
   segmenting the video into a plurality of second segments in response to a second request for the video, wherein the first segments are different from the second segments.

9. The method of claim 1, wherein segmenting comprises segmenting the video into the first segments having the respective ends selected based upon a percentage of a total duration of the video.

10. A non-transitory computer readable medium having instructions stored thereon that, in response to execution, cause a device including a processor to perform operations comprising:
    segmenting a video into a plurality of first segments;
    monitoring playback of the video for occurrences of playback of respective ends of the first segments; and
    in response to each occurrence of playback of an end of a segment among the first segments, providing, to a server located remotely from the device, playback data for the video specifying that the playback of the end of the segment has occurred and an indication of whether the playback of the video was an advertisement presentation type or a non-advertisement presentation type.

11. The non-transitory computer readable medium of claim 10, wherein segmenting the video comprises segmenting the video into the first segments having varying sizes.

12. The non-transitory computer readable medium of claim 10, wherein monitoring comprises determining that the playback of the video has reached the end of the segment by matching a time specified by a playback timer for the video to an end time of the segment.

13. The non-transitory computer readable medium of claim 10, wherein the operations further comprise identifying, for each segment among the first segments, a respective frame of the video that corresponds to the end of each segment among the first segments.

14. The non-transitory computer readable medium of claim 13, wherein monitoring comprises determining that the playback of the video has reached the end of the segment by determining that the respective frame corresponding to the end of the segment was presented.

15. The non-transitory computer readable medium of claim 10, the operations further comprising:
   in response to initiation of the playback of the video resulting from an advertising request, determining that the playback of the video is the advertisement presentation type; and
   in response to initiation of the playback of the video resulting from a target video request, determining that the playback of the video is the non-advertisement presentation type.

16. The non-transitory computer readable medium of claim 10, wherein providing the playback data to the server comprises transmitting an HTTP request to the server, the HTTP request including a timestamp indicating a time at which the playback of the video reached the end of the segment.

17. The non-transitory computer readable medium of claim 10, wherein segmenting comprises:
   segmenting the video into the first segments in response to a first request for the video; and
   segmenting the video into a plurality of second segments in response to a second request for the video, wherein the first segments are different from the second segments.

18. The non-transitory computer readable medium of claim 10, wherein segmenting comprises segmenting the video into the first segments having the respective ends selected based upon a percentage of a total duration of the video.

19. A device comprising:
   a processor, communicatively coupled to a memory that stores computer-executable components, that executes or facilitates execution of the computer-executable components comprising:
   a video player configured to:
      segment a video into a plurality of first segments;
      monitor playback of the video for occurrences of playback of respective ends of the first segments; and
      in response to each occurrence of playback of an end of a segment, among the first segments, provide, to a server located remotely from the device, playback data for the video specifying that the playback of the end of the segment has occurred and an indication of whether the playback of the video was an advertisement presentation type or a non-advertisement presentation type.

20. The device of claim 19, wherein the video player is further configured to segment the video into the first segments having varying sizes.

21. The device of claim 19, wherein the video player is further configured to determine that the playback of the video has reached the end of the segment by matching a time specified by a playback timer for the video to an end time of the segment.

22. The device of claim 20, wherein the video player is further configured to identify, for each segment among the first segments, a respective frame of the video that corresponds to the end of each segment among the first segments.

23. The device of claim 22, wherein the video player is further configured to determine that the playback of the video has reached the end of the segment by determining that the respective frame corresponding to the end of the segment was presented.

24. The device of claim 19, wherein the video player is further configured to:
   in response to initiation of the playback of the video resulting from an advertising request, determine that the playback of the video is the advertisement presentation type; and
   in response to initiation of the playback of the video resulting from a target video request, determine that the playback of the video is the non-advertisement presentation type.

25. The device of claim 19, wherein, to provide the playback data to the server, the video player is further configured to transmit an HTTP request to the server, the HTTP request including a timestamp indicating a time at which the playback of the video reached the end of the segment.

26. The device of claim 19, wherein the video player is further configured to:
   segment the video into the first segments in response to a first request for the video; and
   segment the video into a plurality of second segments in response to a second request for the video, wherein the first segments are different from the second segments.

27. The device of claim 26, wherein the video player is further configured to segment the video into the first segments having the respective ends selected based upon a percentage of a total duration of the video.

* * * * *